United States Patent
Ayadurai et al.

(10) Patent No.: US 10,425,975 B1
(45) Date of Patent: Sep. 24, 2019

(54) METHOD FOR SELECTING A DEVICE TO ACT AS A RELAY DEVICE BETWEEN A FIRST AND A SECOND NODE BASED ON RECEIVED SIGNAL QUALITY MEASUREMENTS

(71) Applicant: TELEFONAKTIEBOLAGET LM ERICSSON (PUBL), Stockholm (SE)

(72) Inventors: Vicknesan Ayadurai, Sollentuna (SE); Mikael Prytz, Rönninge (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 127 days.

(21) Appl. No.: 15/118,675

(22) PCT Filed: Feb. 13, 2014

(86) PCT No.: PCT/SE2014/050176
§ 371 (c)(1),
(2) Date: Aug. 12, 2016

(87) PCT Pub. No.: WO2015/122808
PCT Pub. Date: Aug. 20, 2015

(51) Int. Cl.
*H04W 76/00* (2018.01)
*H04W 76/10* (2018.01)
(Continued)

(52) U.S. Cl.
CPC .......... *H04W 76/10* (2018.02); *H04W 36/30* (2013.01); *H04W 48/20* (2013.01); *H04B 17/309* (2015.01); *H04W 88/04* (2013.01)

(58) Field of Classification Search
CPC ........ H04B 17/309; H04B 17/00; H04B 3/46; H04W 36/30; H04W 48/20; H04W 76/02;
(Continued)

(56) References Cited

U.S. PATENT DOCUMENTS

2007/0274241 A1 11/2007 Brothers
2013/0107736 A1* 5/2013 Yamada ............... H04W 48/18
370/252
(Continued)

FOREIGN PATENT DOCUMENTS

CN 103118417 A 5/2013
EP 1863199 A1 12/2007
(Continued)

OTHER PUBLICATIONS

Novelty Search Report, PRV InterPat, dated Jan. 7, 2014, 10 pages.
(Continued)

*Primary Examiner* — Robert J Lopata
(74) *Attorney, Agent, or Firm* — Rothwell, Figg, Ernst & Manbeck, P.C.

(57) ABSTRACT

A controller controls a communications link between a first node and a second node, by requesting one or more candidate devices to detect signals transmitted by the first and second nodes. It receives signal quality measurements from at least one candidate device, relating to signals received by each respective candidate device from the first and second nodes and, in response to the received signal quality measurements, determines whether to select a candidate device to act as a relay between the first and second nodes. If this determination is made, it requests the selected candidate device to act as a relay between the first and second nodes. A candidate device receives the request from the controller and determines a signal quality measurement of signals received from the first and second nodes. It reports the signal quality measurements of signals received from the first and second nodes to the controller device.

23 Claims, 6 Drawing Sheets

(51) Int. Cl.
*H04W 36/30* (2009.01)
*H04W 48/20* (2009.01)
*H04W 88/04* (2009.01)
*H04B 17/309* (2015.01)

(58) Field of Classification Search
CPC ...... H04W 88/04; H04W 24/00; H04L 43/00; H04L 43/50
USPC .......................................................... 370/252
See application file for complete search history.

(56) References Cited

U.S. PATENT DOCUMENTS

| | | | |
|---|---|---|---|
| 2013/0194948 A1 | 8/2013 | Mallik et al. | |
| 2013/0322388 A1 | 12/2013 | Ahn et al. | |
| 2015/0237555 A1* | 8/2015 | Kashiwase | H04W 36/30 370/329 |
| 2015/0334757 A1* | 11/2015 | Seo | H04W 76/023 370/329 |
| 2016/0337935 A1* | 11/2016 | Patil | H04W 40/22 |
| 2017/0055282 A1* | 2/2017 | Sadiq | H04W 74/004 |
| 2017/0251507 A1* | 8/2017 | Fodor | H04W 76/023 |

FOREIGN PATENT DOCUMENTS

| | | |
|---|---|---|
| EP | 1924009 A1 | 5/2008 |
| EP | 2733988 A2 | 5/2014 |
| WO | 2010006649 A1 | 1/2010 |
| WO | 2013012225 A2 | 1/2013 |

OTHER PUBLICATIONS

International Search Report and Written Opinion dated Oct. 15, 2014, in International Application No. PCT/SE2014/050176, 12 pages.
Cheng et al. "Robust Forwarding for Reactive Routing Protocols in Wireless Ad Hoc Networks with Unreliable Links" IEEE ICC 2011, 6 pages.
Bletsas et al. "A Simple Distributed Method for Relay Selection in Cooperative Diversity Wireless Networks, based on Reciprocity and Channel Measurements" IEEE, 2005, pp. 1484-1488.
European Search Report dated Feb. 14, 2017, issued in European Patent Application No. 14882719.9, 6 pages.
European Communication dated Feb. 21, 2017, issued in European Patent Application No. 14882719.9, 6 pages.
Ma et al. "A Distributed Relay Selection Method for Relay Assisted Device-to-Device Communication System" 2012 IEEE 23rd International Symposium on Personal, Indoor and Mobile Radio Communications—(PIMRC), pp. 1020-1024.
European Communication dated Aug. 2, 2017, issued in European Patent Application No. 14882719.9, 5 pages.
Arogyaswami Paulraj et al. "Introduction to Space-Time Wireless Communications", Jun. 19, 2008, Cambridge University Press, Cambridge (UK), ISBN: 0521065933, pp. 58-60.

* cited by examiner

METHOD FOR SELECTING A DEVICE TO ACT AS A RELAY DEVICE BETWEEN A FIRST AND A SECOND NODE BASED ON RECEIVED SIGNAL QUALITY MEASUREMENTS

CROSS REFERENCE TO RELATED APPLICATION(S)

This application is a 35 U.S.C. § 371 National Phase Entry Application from PCT/SE2014/050176, filed Feb. 13, 2014, designating the United States, the disclosure of which is incorporated herein in its entirety by reference.

TECHNICAL FIELD

This invention relates to a method, for use in a controller, for controlling a communications link between first and second nodes. Particularly, but not exclusively, it relates to providing a relay selection mechanism to determine if a node could provide relay functionality to an ongoing communication between the two nodes.

BACKGROUND

In wireless communications, information is transmitted from a source node to a destination node over the air. The larger the transmit power at the source node, the larger the possible distance between the source node and destination node. However, the relationship between transmit-power and distance is non-linear. Doubling the separation between the source node and the destination node requires more than a doubling of transmit-power at the source node in order to receive a similar signal level at the destination node.

Placing a third node, a relay node, in between the source node and destination node enables the single long-range transmission hop from source to destination to be substituted by two shorter transmission hops, i.e. from the source node to the relay node, and subsequently, from the relay node to the destination node.

In spite of the additional delay incurred by relaying the data (i.e. using two hops instead of a single hop), due to the non-linear relationship mentioned above, the energy savings gained by replacing a single large hop with two shorter-haul transmissions could nonetheless be beneficial, especially when considered on a system-wide scale.

Therefore, in a wireless network comprising of multiple nodes, for any communication between a source node and a destination node, a third node may be enlisted to act as a relay node in order to improve the energy efficiency of the entire system.

The problem then faced is how to determine which of the other nodes in the system, if any, could act as a relay node for an ongoing communication between a source node and a destination node.

WO2010/006649 discloses a cellular system, allowing direct device-to-device communication between terminal devices, and also allowing a controller to select some of the terminal devices to act as relays to enable relayed communication links between other terminal devices and the base station. The controller determines a number of relay terminals required in a cell, and terminal devices are then selected to act as relays based on the channel conditions between the base station and the respective terminal devices.

However, this system does not provide the best possible selection of a relay device, particularly in the case of device-to-device communication between terminal devices without passing through the base station.

SUMMARY OF THE INVENTION

According to the present invention there is provided a method in a controller for controlling a communications link between a first node and a second node. The method comprises requesting one or more candidate devices to detect signals transmitted by the first node and the second node and receiving signal quality measurements from at least one candidate device, relating to signals received by each respective candidate device from the first and second nodes. In response to the received signal quality measurements, it is determined whether to select a candidate device to act as a relay between the first and second nodes and, if so, the selected candidate device is requested to act as a relay between the first and second nodes.

The method may further comprise identifying the one or more candidate device from a group of devices based on information relating to locations of each device and of the first and second nodes.

The method may further comprise requesting the first node to report a signal quality measurement relating to signals received from the second node, and requesting the second node to report a signal quality measurement relating to signals received from the first node. The step of determining whether to select a candidate device to act as a relay between the first and second nodes may then comprise comparing the signal quality measurements received from the at least one candidate device to the signal quality measurements received from the first and second nodes, and may comprise determining if the signal quality measurements received from one of the at least one candidate devices indicate higher signal quality than the signal quality measurements received from the first and second nodes and, if so, selecting that one candidate device to act as a relay between the first and second nodes.

The signal quality measurements may be signal strength measurements.

According to another aspect of the present invention there is provided a controller device comprising a transmitter, for transmitting signals to communication devices, a receiver, for receiving signals from communication devices, and a processor. The processor is adapted to request one or more candidate devices to detect signals transmitted by a first node and a second node, and receive signal quality measurements from at least one candidate device, relating to signals received by each respective candidate device from the first and second nodes. In response to the received signal quality measurements, the processor determines whether to select a candidate device to act as a relay between the first and second nodes and, if so, the selected candidate device is requested to act as a relay between the first and second nodes.

The controller device may further comprise a memory containing instructions executable by said processor.

According to another aspect of the present invention there is provided a method in a candidate device comprising receiving a request from a controller to detect signals transmitted by the first and second nodes, and determining a signal quality measurement of signals received from the first and second nodes. The method then comprises reporting the signal quality measurements of signals received from the first and second nodes to the controller device.

The method may further comprise determining if the candidate device can detect signals from both the first and second nodes, and, if so, determining the signal quality measurements of signals received from the first and second node, and reporting the signal quality measurements to the controller device.

The signal quality measurements may be signal strength measurements.

The candidate device may then receive a request from a controller device to act as a relay node between the first and second node. In response to such a request from the controller device, the method comprises configuring the candidate device to act as a relay node between the first and second node.

According to another aspect of the present invention there is provided a communications device comprising a receiver, for receiving wireless signals, a transmitter, for transmitting wireless signals, and a processor. The processor is adapted to receive a request from a controller device to detect signals transmitted by first and second nodes, determine a signal quality measurement of signals received from the first and second nodes, and report the signal quality measurements of signals received from the first and second nodes to the controller device.

The communications device may further comprise a memory containing instructions executable by said processor.

According to another aspect of the present invention there is provided a computer program product comprising code adapted to cause a programmed device to carry out the method according to any other aspect of the invention.

According to another aspect of the present invention there is provided a computer program product comprising a non-transitory computer-readable medium containing code adapted to cause a programmed device to request one or more candidate device to detect signals transmitted by a first node and a second node. The programmed device is then caused to receive signal quality measurements from at least one candidate device, relating to signals received by each respective candidate device from the first and second nodes and, in response to the received signal quality measurements, to determine whether to select a candidate device to act as a relay between the first and second nodes, and, if so, to request the selected candidate device to act as a relay between the first and second nodes.

According to another aspect of the present invention there is provided a computer program product comprising a non-transitory computer-readable medium containing code adapted to cause a programmed device to receive a request from a controller device to detect signals transmitted by first and second nodes, determine a signal quality measurement of signals received from the first and second nodes, and report the signal quality measurements of signals received from the first and second nodes to the controller device.

This has the benefit that a controller can make an appropriate selection of a device to act as a relay.

BRIEF DESCRIPTION OF THE DRAWINGS

For a better understanding of the present invention, and to show more clearly how it may be carried into effect, reference will now be made, by way of example, to the accompanying drawings, in which.

DESCRIPTION

Figure 1:
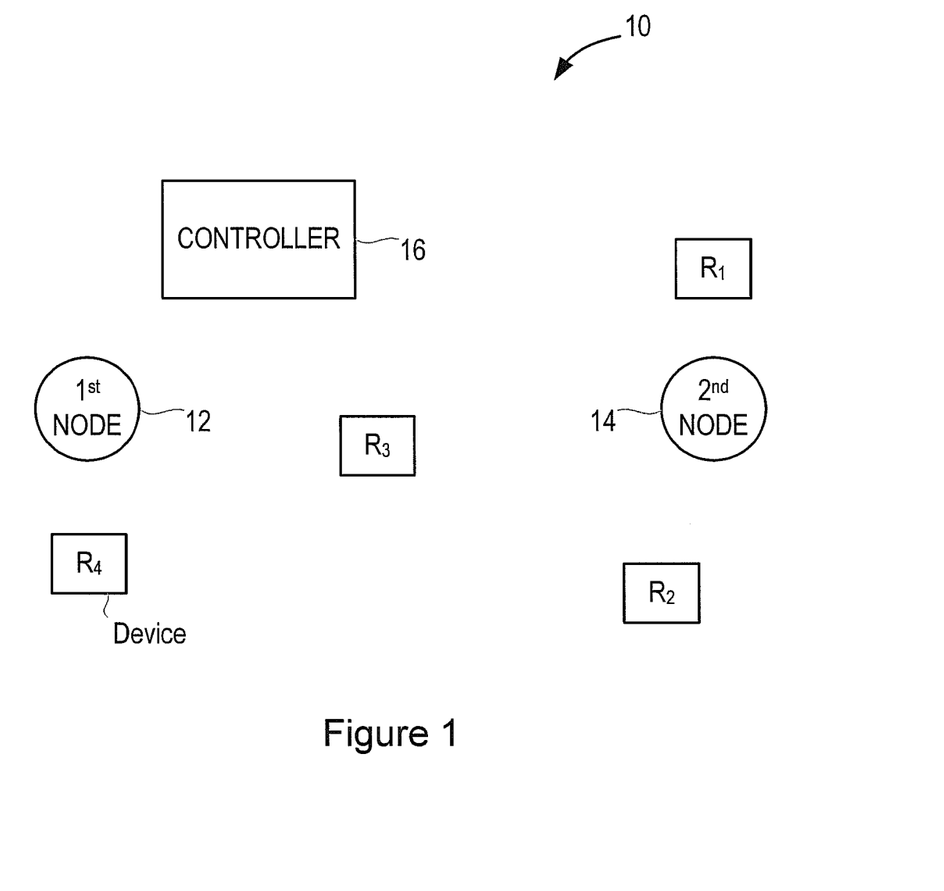
FIG. 1 shows an example of a mobile communications network according to an aspect of the present invention.

FIG. 1 shows a part of a cellular communications network 10, including a first node 12, a second node 14, and additional devices R1, R2, R3 and R4. There is also a controller 16. In some embodiments the controller may be a basestation, or located within a basestation of the network, but in other embodiments the controller may be located within another device or be part of a dedicated controller device.

This invention may be used in a mobile communication network, for example in third generation (3G) networks including Universal Mobile Telecommunications System (UMTS), Wideband Code Division Multiple Access (WCDMA) and High Speed Packet Access (HSPA) systems and fourth generation (4G) networks including Evolved Packet System (EPS), Long Term Evolution (LTE) and LTE-Advanced (LTE-A). The particular embodiments described below are not limited to any suitable particular network. It will, therefore, be appreciated by those skilled in the art that the invention can be readily applied to any mobile communication network.

Those skilled in the art will appreciate that the functions described may be implemented in one or more nodes using hardware circuitry and/or using software programs and data in conjunction with one or more digital microprocessors or general purpose computers. Nodes and devices that communicate using the air interface also have suitable radio communications circuitry. Moreover, the technology can additionally be considered to be embodied entirely within any form of computer-readable memory, such as solid-state memory, magnetic disk, or optical disk containing an appropriate set of computer instructions that would cause a processor to carry out the techniques described herein.

Embodiments are described, in which the first node 12, the second node 14, and the additional devices R1, R2, R3 and R4, are all user equipment devices (UEs) operational within the cellular network, such as phones, portable computers, or the like. However, the first node 12, the second node 14, and the additional devices R1, R2, R3 and R4, can be any type of communications device, in particular having a wireless connection. For example, one or more of the first node 12, the second node 14, and the additional devices R1, R2, R3 and R4 can be a base station of the cellular network.

Figure 2:
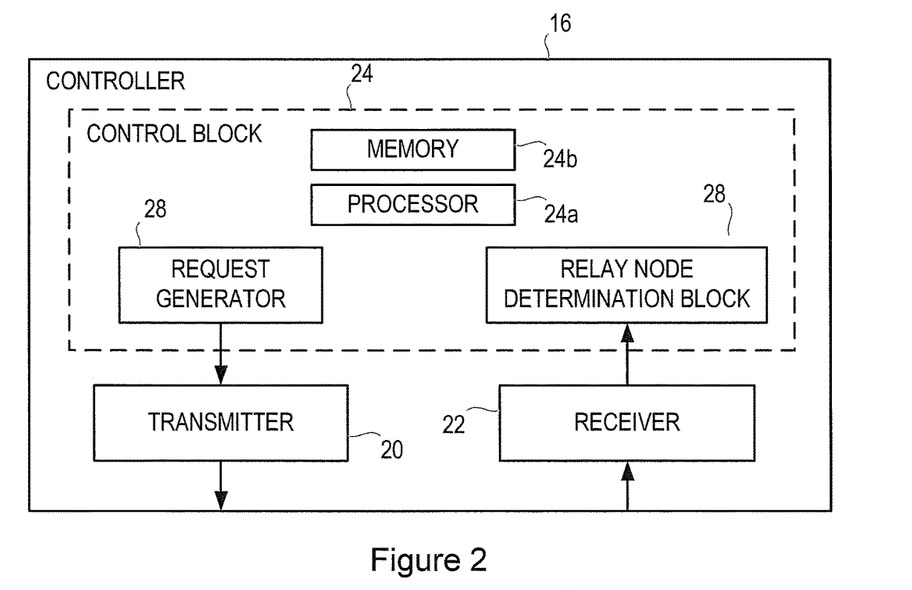
FIG. 2 shows a more detailed view of the controller in FIG. 1.

FIG. 2 shows in more detail the form of the controller 16. The controller 16 comprises a transmitter 20, a receiver 22 and a control block 24. The transmitter 20 is adapted for transmitting signals to be detected by other devices in the network, under the control of the control block 24. The receiver 22 receives signals from other devices in the network and passes them to the control block 24. In this example, the control block 24 comprises a processor 24a and a memory 24b, containing instructions for causing the processor to operate as described below. The control block 24 can then be thought of as containing various functional blocks.

In particular, as described in more detail below, the control block 24 comprises a request generator 28 which can generate requests to be sent out to candidate devices (such as the devices R1-R4) requesting them to listen to the communications link between the first node 12 and the second node 14 and provide signal quality measurements relating to the communication link, and can also generate similar requests to be sent out to the first node 12 and the second node 14.

Also, in particular, the receiver 22 receives the signal quality measurements which are sent by candidate devices (such as the devices R1-R4) in response to the requests. The control block comprises a relay node determination block 26 which receives the signal quality measurements and, as described in more detail below, determines which of the candidate devices, if any, can act as a relay node.

Figure 3:
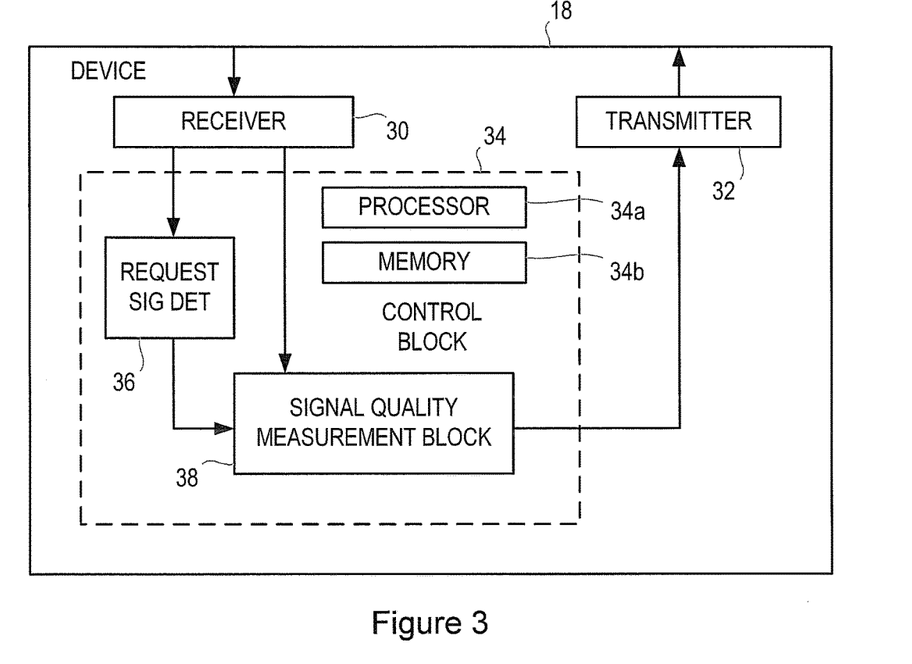
FIG. 3 shows a more detailed view of a device in FIG. 1.

FIG. 3 shows in more detail the form of a device. As discussed above, a device may take the form of a mobile phone, portable computer, or any other device that is able to make wireless connections. In FIG. 1, each of the first and second nodes 12, 14, and each of the candidate devices R1-R4 may have the form of the device 18 shown in FIG. 3. The device 18 comprises a receiver 30, a transmitter 32 and a control block 34. The transmitter 32 is adapted for transmitting signals to be detected by other devices in the network, under the control of the control block 34. The receiver 30 receives signals from other devices in the network and passes them to the control block 34. In this example, the control block 34 comprises a processor 34a and a memory 34b, containing instructions for causing the processor to operate as described below. The control block 34 can then be thought of as containing various functional blocks.

In particular, as described below, the receiver 30 receives the request signals from the controller 16 to begin listening to the communications link between the first node 12 and second node 14. This request is then passed on to the control block. In particular, the control block 34 comprises a request signal detection block 36 which detects when a request signal has been sent to the device. This then commands a signal quality measurement block 38 to commence listening to the communications link between the first node 12 and second node 14. Specifically, in this embodiment, there already exists a communications link between the first node 12 and the second node 14, and the receiver 30 eavesdrops on the signals sent between the first node 12 and second node 14, and passes them on to the signal quality measurement block 38 which measures the signal quality of the communications link. Thus, in this embodiment, there is no requirement for the first node 12 and the second node 14 to alter their behaviour, for example by transmitting special signals to be detected by the candidate devices R1-R4.

The signal quality measurements made by the signal quality measurement block 38 are then sent back to the controller 16 via the transmitter 32.

It will be appreciated that the functional control blocks 24, 34 described in FIGS. 2 and 3 may each be implemented as a respective processor and memory, wherein said memory contains instructions which are executable by said processor. Furthermore, software may be provided which contains code which is capable of causing a device to function as described below, using the existing hardware capability of the wireless device. Software modules recognize signalling messages originating from the controller, and execute them at the device.

Embodiments will now be described with reference to FIG. 4, which is presented as a flow chart, and FIG. 5, which illustrates messages passing between the various entities.

In a wireless network comprising of multiple nodes, it can be assumed that control-communication mechanisms exist between the network and its device nodes. Further, for the purpose of this example, it is assumed that an ongoing direct point-to point communication link, i.e. bypassing the network, is already established between a first node and a second node. In one example, the first node takes the form of a source node and the second node takes the form of a destination node, in that useful data is being transmitted from the first node to the second node, with acknowledgement signals or the like being transmitted from the second node to the first node. However, it will be appreciated that the communication between the first node and the second node might be completely bi-directional, with data being transmitted from the first node to the second node and from the second node to the first node.

The network then wishes to determine and identify if there exists an additional device in the vicinity of the first and second nodes which would be capable of acting as a relay node for the communications link between the first and second node, resulting in a more energy efficient communications stream.

In the illustrated embodiment, this request may be initiated by the network, but is at least partially processed and evaluated locally at the individual devices or nodes. The individual nodes or devices may then report information back to the network for further analysis and evaluation. This at least partial processing at the individual devices or nodes provides the advantage that the overhead on the network will be greatly reduced.

Figure 4:
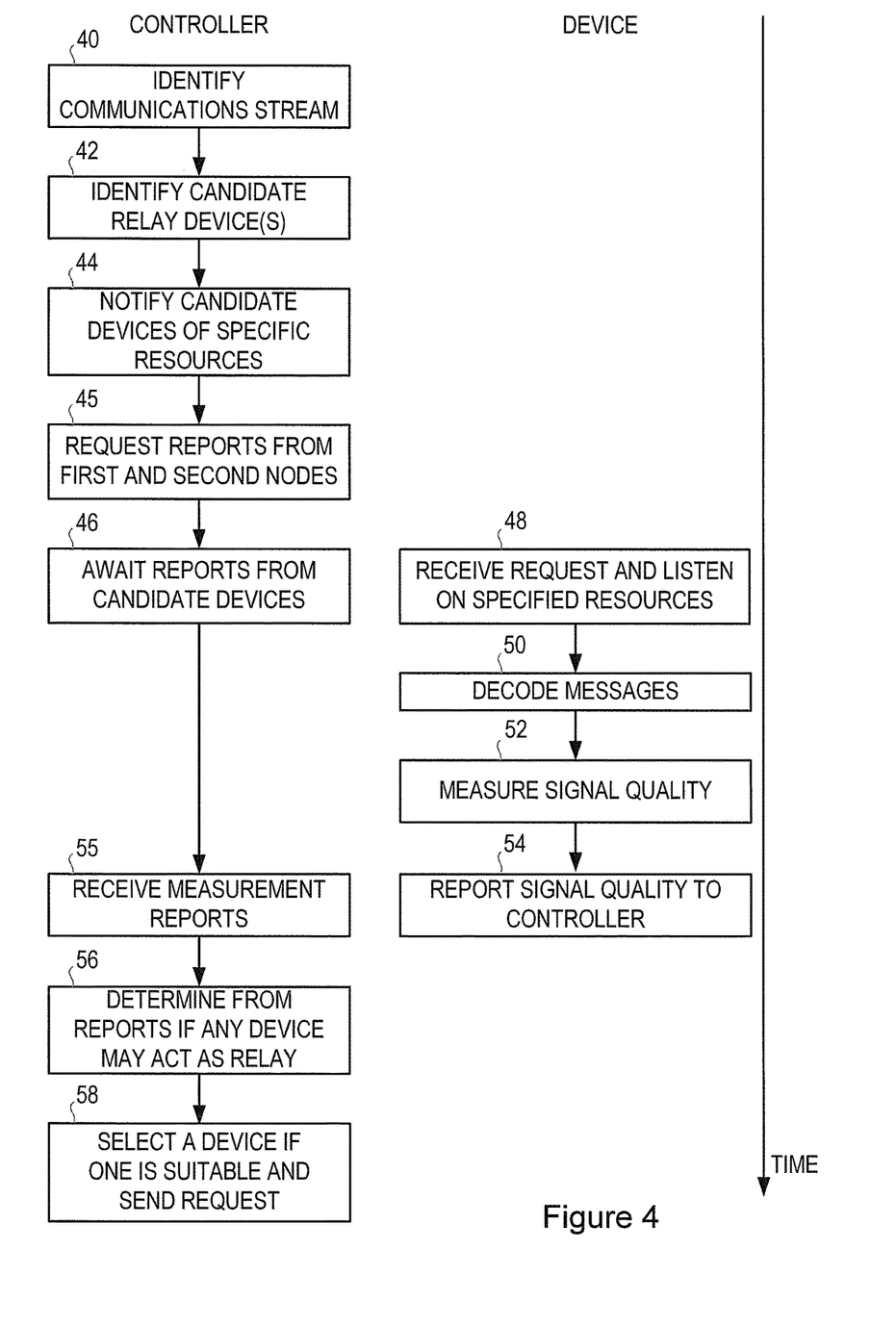
FIG. 4 is a flowchart according to an aspect of the present invention.

FIG. 4 shows a flow diagram according to an embodiment of the invention. Specifically, FIG. 4 shows steps that are carried out within the controller 16 and steps that are carried out within each candidate relay device 18, such as the devices R1-R4 shown in FIG. 1. It will be appreciated that each of these steps may be carried out by software modules which may be implemented as a computer program running on a processor.

In step 40, the controller identifies an ongoing communications stream between a first node 12 and a second node 14 as being potentially improved by the implementation of a relay node.

In step 42, the controller identifies devices in the vicinity of the first node 12 and the second node 14 which are found to be candidate devices for operating as a relay node. The controller can be assumed to be aware of the approximate geographical locations of the first node and the second node, and of other devices operating in the network. For example, in a cellular network, all devices within the same cell or sector of a cell as the first node 12 and the second node 14 may be identified as candidate devices. More generally, the controller may identify devices based on any information relating to the locations of the devices and of the first node 12 and the second node 14. If possible, the controller may infer information about the distances of the devices from the first node 12 and the second node 14.

In step 44, the controller 16 notifies the candidate devices R1-R4 about the communications stream between the first node 12 and the second node 14. The controller 16 also requests that the candidate devices R1-R4 listen to the communications stream between the first node 12 and the second node 14. Referring to FIG. 2, a request is generated by the request generator 28 and is sent over the transmitter 20 to the candidate devices (R1-R4).

The requests indicate the specific resources being used by the communications stream. These specific resources could for example comprise specific time slots and/or frequency subcarriers, for example in the form physical resource blocks. The requests may also include the communication parameters needed to decode the transmissions on these resources, as well as the duration for which this listening should take place. The time period may be long enough for the respective candidate device to obtain a measure of the signal quality of the signals that it receives from the first node and from the second node, having been transmitted on the communications link between the first node 12 and second node 14.

The requests (M1 in FIG. 5) may be sent on individual downlink channels from a base station to the identified candidate devices. Alternatively, a single request can be broadcast from the base station to all devices that are located in the same approximate geographical location as the first node and the second node, for example to all other devices within the same cell or sector of a cell as the first node 12 and the second node 14.

In step 45 of this illustrated embodiment, the controller 16 also sends requests (M2 in FIG. 5) to both the first node 12 and the second node 14 instructing these devices to obtain a respective measurement relating to the signal quality of the signal received from the respective other device, and to report this measurement back to the controller 16.

In some embodiments the signal quality measurement is a direct signal quality measurement, such as a signal strength measurement. In some embodiments the signal quality measurement includes the average of the received signal strength indication (RSSI) values for each data packet received by each candidate device over the time period, taken for both the first node 12 and second node 14. In other embodiments, the signal quality measurement is a higher layer derivative, such as a packet error rate or the lengths of contiguous sequences of successfully decoded packets (identified by sequence numbers), Having sent the requests to the candidate devices (R1-R4), and possibly also to the first node 12 and the second node 14, the controller 16 then waits for responses from those devices in step 46.

In step 48, each candidate device (R1-R4) receives the request over its respective receiver 30. These requests are passed to the request signal detection block 36 of the device 14. As noted above, the request specifies the resources being used for the connection between the first node 12 and second node 14, and this information is passed onto the signal quality measurement block 38. This causes the receiver 30, to listen to the signals received on those specific resources from both the first node 12 and the second node 14.

In step 50, the messages received on those specific resources may then be decoded using the decoding parameters provided with the request signal such that they can detect the continuity of the overheard communications stream. For example, if the candidate device is able to decode message header sequence numbers in the signals sent between the first node 12 and the second node 14, it can implicitly use these to detect losses.

In step 52, the signal quality of the communications link is measured. The specific measurement of the signal quality may be any form of signal quality measurement. In particular, it may be a signal strength measurement. In other embodiments, as discussed above, the signal quality measurement is an indirect measurement of signal quality.

Figure 5:
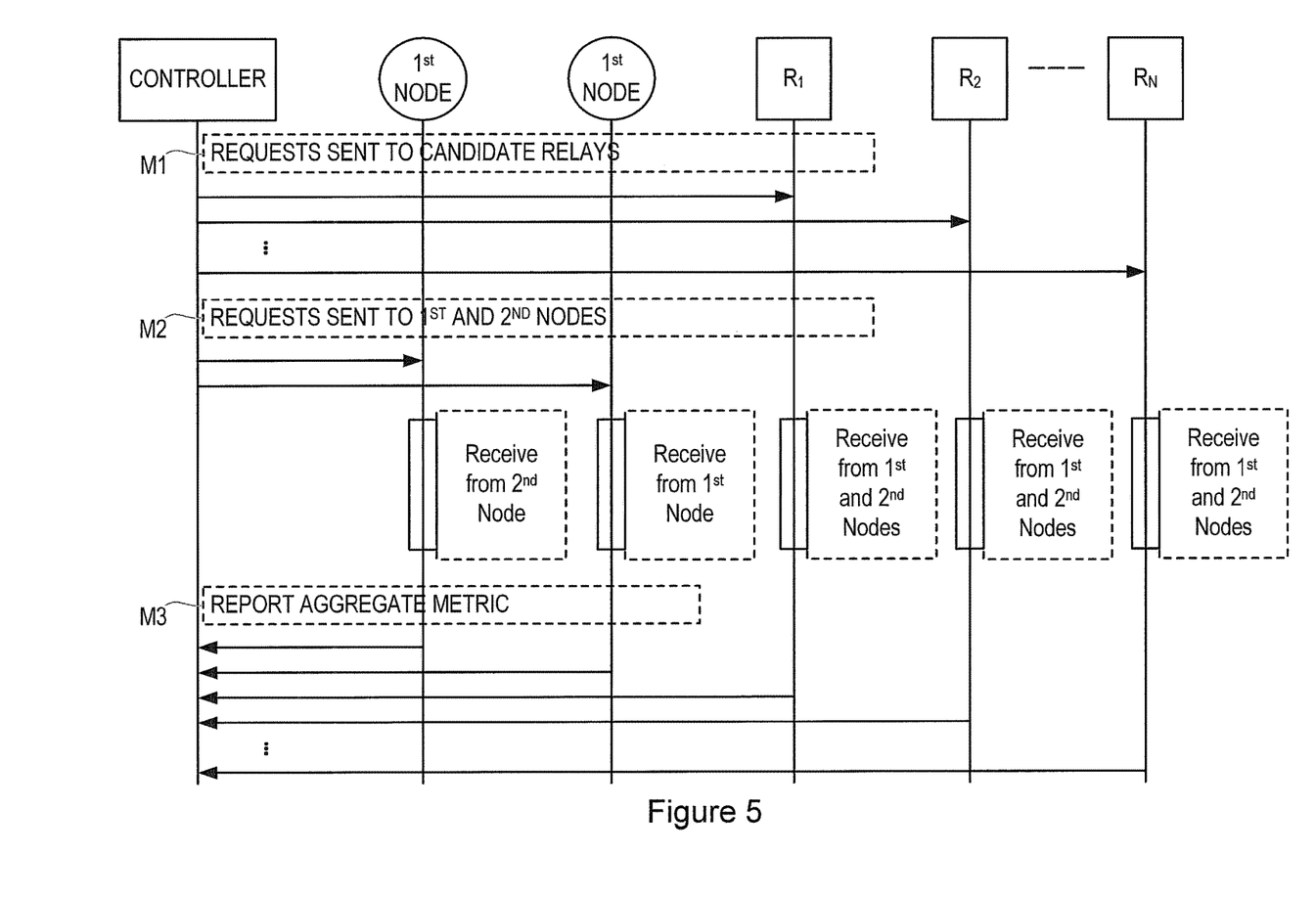
FIG. 5 is a signalling diagram illustrating an exchange of signals in an embodiment of the network.

In step 54, the candidate devices report their respective signal quality measurements back to the controller 16 (M3 in FIG. 5). These reports may be sent on a shared broadcast or sent on separate uplink channels from each individual device.

Figure 6:
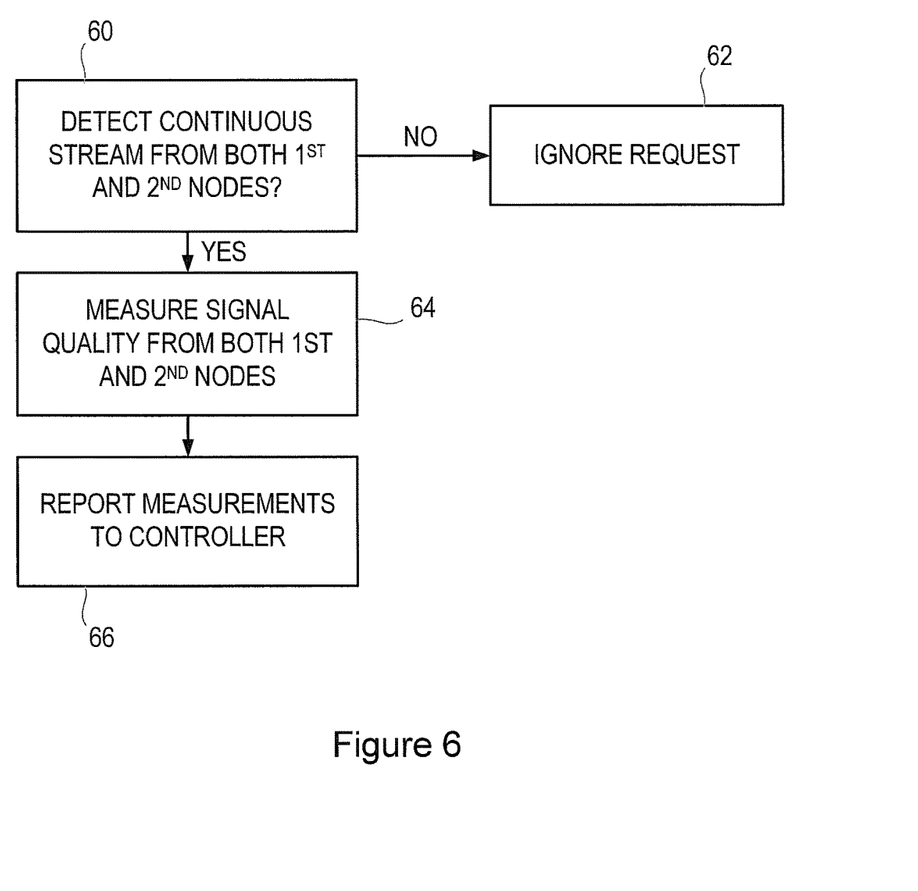
FIG. 6 is a flowchart illustrating an embodiment of the invention.

FIG. 6 shows in more detail a part of the process performed in a candidate device. In this illustrated embodiment, having decoded the messages received from the first and second nodes in step 50 of FIG. 4, the device determines in step 60 whether it is able to detect a continuous stream of data packets from each of the first node 12 and second node 14. If the device determines in step 60 that it is not able to detect a continuous stream of data packets, for example if the packet error rate exceeds a threshold value, the process passes to step 62 and ends.

That is, if the candidate device determines that it is not able to detect a sufficiently continuous stream of data packets from one or both of the first and second nodes, it determines that it is not a good candidate to act as a relay between those nodes. In that case, in this embodiment, the device ignores the request from the controller, and does not send any report in reply.

This has the advantage that the candidate devices for becoming a relay device only report information back to the network if they are able to detect a continuous signal from both the nodes involved in the relevant communications link. This reduces the overhead on the network as the controller does not need to process reports from unsuitable candidate devices.

Similarly, if a request is sent at step 44 to a device, for example an older legacy device that is not equipped to act as a relay, or to deal with such requests, it would simply ignore and silently discard the request signal, and would not report any measured results back to the controller 16.

If the device determines in step 60 that it is able to detect a continuous stream of data packets from the first node 12 and from the second node 14, the process passes to step 64, in which the device obtains a measure of the signal quality of the signals that it is able to detect from the first and second nodes.

Specifically, each candidate device listens to the specified communications stream between the first node 12 and the second node 14, for example for a time period which may be indicated in the request signal sent by the controller 16. The candidate devices store data relating to the signal quality, for example the Received Signal Strength Indication (RSSI), of the signals received from both the first node 12 and the second node 14. In addition, or alternatively, another quality measure such as the packet error rate statistics may be computed.

As shown in step 66, each candidate device (R1-RN) will then report an aggregate metric, for example the average RSSI, for signals received both from the first node 12 and from the second node 14, back to the controller 16.

Similarly, if the controller 16 also sends requests to the first node 12 and the second node 14 instructing these devices to obtain measurements relating to the signal quality of the signal received from the respective other device, the first node 12 and the second node 14 obtain metrics that are comparable with those obtained by the candidate devices, such as average RSSI or packet error rate statistics, and they report these measurements back to the controller 16.

In step 55 of the process shown in FIG. 4, after a time period specified in the request signals has elapsed, the controller 16 receives the requested reports from some or all of the candidate devices (R1-R4) (for example those that are able to detect the signals satisfactorily, and which are offering themselves for consideration as a relay node), and from the first and second nodes (if requested to report measurements). The process then passes to step 56, in which the controller determines if any of the candidate devices may act as a relay, and (if so) to step 58, in which the controller selects the device to act as the relay.

Figure 7:
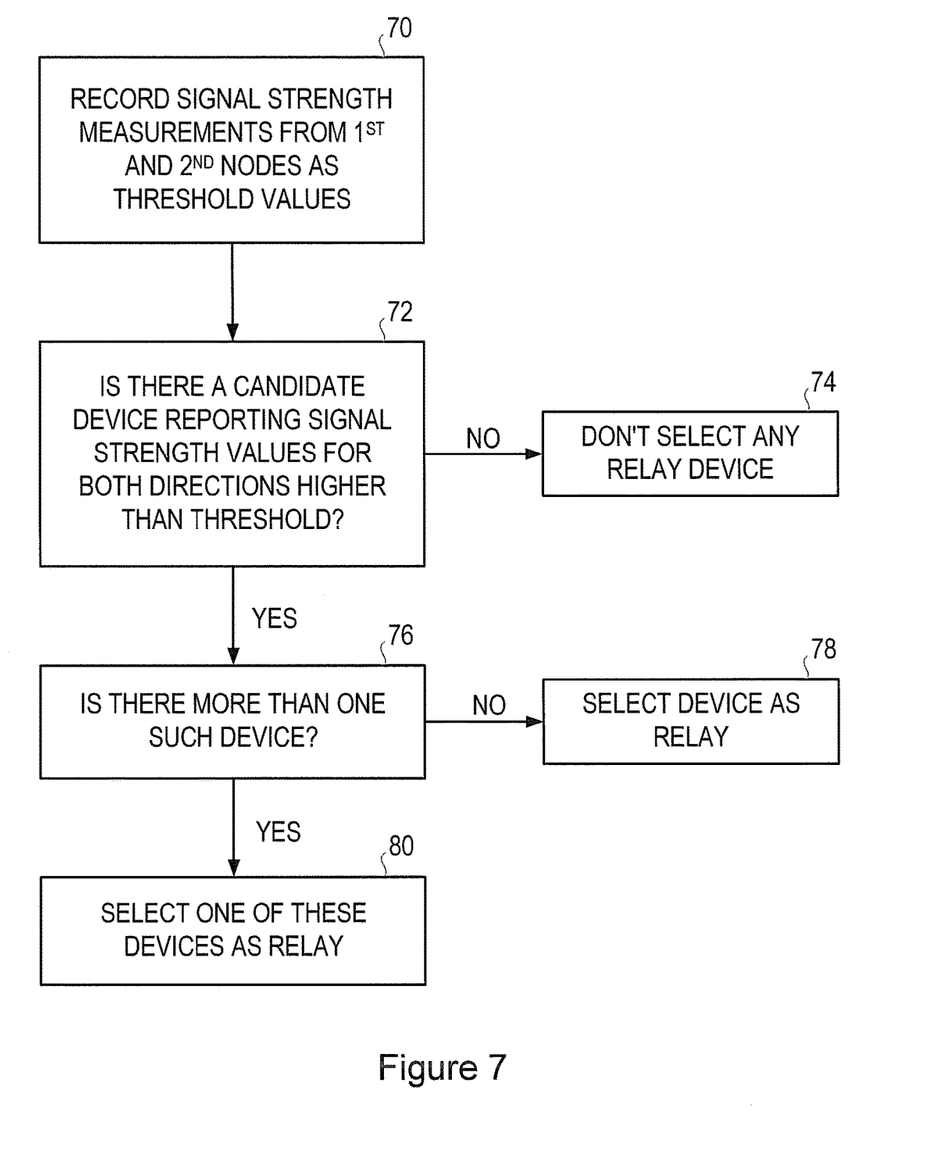
FIG. 7 is a flowchart illustrating an embodiment of the invention.

One particular embodiment of these steps is illustrated in more detail in a flow diagram in FIG. 7. Again, it will be appreciated that each of these steps may be carried out by software modules which may be implemented as a computer program running on a processor.

In this example, the signal quality measurements reported by each candidate device, the first node and the second node are signal strength measurements.

In particular, each candidate device (R1-R4) will measure the received signal strength indication (RSSI) for data packets received both from the first node 12 and from the second node 14. As each candidate device listens to the communications stream for a period of time which may be stipulated by the request signal received from the controller, each candidate device may then form an average RSSI value for each respective node at the end of said time period.

Similarly, the first node 12 may produce an average RSSI value for the signal received from the second node 14, and the second node 14 may produce an average RSSI for the signal received from the first node 12.

Table 1 shows, for illustration only, an example of the possible average RSSI values (in suitable units, where higher values represent higher signal strength and therefore better link qualities) reported by the first node 12, second node 14 and the candidate

| Reporting Node/device | Average RSSI (signals received from $1^{st}$ node) | Average RSSI (signals received from $2^{nd}$ Node) |
| --- | --- | --- |
| $1^{st}$ Node | — | 200 |
| $2^{nd}$ Node | 205 | — |
| R1 | 150 | 300 |
| R2 | 210 | 450 |
| R3 | 300 | 303 |
| R4 | 400 | 156 |

In step 70 of FIG. 7, the controller 16 sets the values reported by the first node 12 (for signals received from the second node 14) and reported by the second node 14 (for signals received from the first node 12) as threshold values. Thus, in this illustration, the threshold value for the RSSI average for signals received from the first node 12 is set to 205, and the threshold value for the RSSI average for signals received from the second node is set to 200.

In step 72, the controller 16 then determines if there are any candidate devices reporting a pair of RSSI average values which are both higher than the respective threshold values which have been set for the two nodes. In this case, it can been seen from Table 1 that only two candidate devices, R2 and R3, have satisfied this condition. This is because R2 has reported an average RSSI of 210 for signals received from the first node, which is higher than the threshold value of 205, and has reported an average RSSI of 450 for signals received from the second node, which is higher than the threshold value of 200. Meanwhile, R3 has reported an average RSSI of 300 for signals received from the first node, which is higher than the threshold value of 205, and has reported an average RSSI of 303 for signals received from the second node, which is higher than the threshold value of 200.

If it had been determined in step 72 that none of the candidate devices had reported a pair of RSSI values that were both higher than the respective thresholds, then no relay device would be selected, as shown in step 74.

In step 76, the controller 16 determines whether or not there is more than one device which has reported suitable RSSI average values both exceeding the respective threshold. If there is only one, then that device is selected as a relay node as shown in step 78. If there is more than one candidate device which has reported suitable average RSSI values then the process passes to step 80, and one of these devices is selected as a relay node. For example, this might involve selecting the device having the highest combined average RSSI value (i.e. the highest value obtained by adding together the average RSSI for signals received from the first node and the average RSSI for signals received from the second node). In the illustrated example, this would lead to the selection of candidate device R2 (having a combined average RSSI value of 210+450=660) rather than R3 (having a combined average RSSI value of 300+303=603).

Alternatively, the margins by which the average RSSI values exceed the respective thresholds could be considered. For example, the average RSSI at R2 exceeds the respective thresholds by margins of 5 (i.e. 210–205) and 250 (i.e. 450–200), while the average RSSI at R3 exceeds the respective thresholds by margins of 95 (i.e. 300–205) and 103 (i.e. 303–200). In this situation, R3 might be selected as the preferred candidate device, because the lower of these two margins for R3 is higher than the lower of the two margins for R2. This suggests that R3 is more likely to remain a suitable relay device as the first and second nodes and the devices move in the future.

Thus, in this illustrated example, it is decided that, in order to be a suitable relay device, a candidate device must have high signal strength values reported for signals received both from the first node 12 and from the second node 14. For a device such as R4, even though it has produced a high average RSSI of 400 for signals received from the first node 12, it is apparently far away from the second node 14, and so it has only produced an average RSSI of 156 for signals received from the second node 14. It would, therefore, not be a suitable candidate for a relay device as, given that the second node records an average RSSI of 200 for signals received from the first node, the selection of R4 as a relay would potentially reduce the signal strength received by the second node 14.

The performance of the relay is determined by the performance of the worst link, so the most suitable candidate is typically the one whose worse link is better than the worse link of the other candidates.

In this illustrated example, the signal strength values reported by the first and second nodes are used as threshold values when deciding whether a particular candidate device is suitable for use as a relay device. In another example, the threshold values are set to be higher than the signal strength values reported by the first and second nodes by respective margins. If a candidate device reports signal strength values that are only slightly above the signal strength values reported by the first and second nodes, then the advantages of using a relay device may not be sufficient to justify the disadvantages.

Having selected a device to act as a relay node, the controller 16 sends a request to the selected device in step 58 of the process shown in FIG. 4, indicating that the device should commence functioning as a relay node for the communications stream between the first node 12 and the second node 14. The request provides the selected device with the information that it needs so that it can act as a relay node. The selected device then configures itself so that it can act as a relay node for the communications stream between the first node 12 and the second node 14, receiving signals from the first node and transmitting them on to the second node, and receiving signals from the second node and transmitting them on to the first node.

An instruction to the chosen device to become a relay may be sent from the controller 16 by means of the transmitter 20.

There is thus described a method that allows selection of a suitable device to act as a relay.

The invention claimed is:

1. A method in a controller for controlling a direct point-to-point communications link between a first user equipment, UE, and a second UE, the method comprising:
   the controller requesting one or more candidate devices to detect signals transmitted by the first UE and the second UE;
   the controller receiving signal quality measurements from at least one candidate device, wherein the signal quality measurements relate to signals received by each respective candidate device from the first and second UEs;
   in response to the received signal quality measurements, the controller determining whether to select a candidate device to act as a relay between the first and second UEs; and
   as a result of determining to select the candidate device to act as a relay, the controller requesting the selected candidate device to act as a relay between the first and second UEs,
   wherein a base station serving the first UE and the second UE comprises the controller.

2. The method as claimed in claim 1, further comprising identifying the one or more candidate device from a group of devices based on information relating to locations of each device and of the first and second UEs.

3. The method as claimed in claim 1, further comprising:
   requesting the first UE to report a signal quality measurement relating to signals received from the second UE, and
   requesting the second UE to report a signal quality measurement relating to signals received from the first UE.

4. The method as claimed in claim 3, wherein the step of determining whether to select the candidate device to act as a relay between the first and second UEs comprises:
   comparing the signal quality measurements received from the at least one candidate device to the signal quality measurements received from the first and second UEs.

5. The method as claimed in claim 4, wherein the step of determining whether to select the candidate device to act as a relay comprises:
   determining whether signal quality measurements received from a first candidate device indicate higher signal quality than the signal quality measurements received from the first and second UEs; and
   as a result of determining that the signal quality measurements received from the first candidate device indicate higher signal quality than the signal quality measurements received from the first and second UEs, selecting the first candidate device to act as a relay between the first and second UEs.

6. The method as claimed in claim 1, wherein the signal quality measurements are signal strength measurements.

7. A controller device comprising:
   a transmitter, for transmitting signals to communication devices;
   a receiver, for receiving signals from communication devices; and
   a processor adapted to:
      request one or more candidate devices to detect signals transmitted by a first user equipment, UE, and a second UE;
      receive signal quality measurements from at least one candidate device, wherein the signal quality measurements relate to signals received by each respective candidate device from the first and second UEs;
      in response to the received signal quality measurements, determine whether to select a candidate device to act as a relay between the first and second UEs; and
      as a result of determining to select the candidate device to act as a relay, request the selected candidate device to act as a relay between the first and second UEs,
   wherein a base station serving the first UE and the second UE comprises the controller device.

8. The controller device as claimed in claim 7, wherein the processor is further adapted to identify the one or more candidate device from a group of devices based on information relating to locations of each device and of the first and second UEs.

9. The controller device as claimed in claim 7, wherein the processor is further adapted to:
   request the first UE to report a signal quality measurement relating to signals received from the second UE, and
   request the second UE to report a signal quality measurement relating to signals received from the first UE.

10. The controller device as claimed in claim 9 wherein, in order to determine whether to select the candidate device to act as a relay, the processor is further adapted to:
    compare the signal quality measurements received from the at least one candidate device to the signal quality measurements received from the first and second UEs.

11. The controller device as claimed in claim 10 wherein, in order to determine whether to select the candidate device to act as a relay, the processor is further adapted to:
    determine whether signal quality measurements received from a first candidate device indicate higher signal quality than the signal quality measurements received from the first and second UEs; and
    as a result of determining that the signal quality measurements received from the first candidate device indicate higher signal quality than the signal quality measurements received from the first and second UEs, select the first candidate device to act as a relay between the first and second UEs.

12. The controller device as claimed in claim 7, wherein the signal quality measurements are signal strength measurements.

13. The controller device as claimed in claim 7, further comprising a memory containing instructions executable by said processor.

14. A method of controlling a communications link between a first user equipment, UE, and a second UE, the method comprising:
    the candidate device receiving a request from a controller device to detect signals transmitted by the first and second UEs;
    the candidate device determining a signal quality measurement of signals received from the first and second UEs;
    the candidate device reporting the signal quality measurements of signals received from the first and second UEs to the controller device; and
    the candidate device receiving a request from the controller device to act as a relay node between the first and second UEs, wherein a base station serving the first and the second UE comprises the controller device.

15. The method as claimed in claim 14, further comprising:
    determining whether the candidate device can detect signals from both the first and second UEs;
    as a result of determining that the candidate device can detect signals from both the first and second UEs, determining the signal quality measurements of signals received from the first and second UE, and reporting the signal quality measurements to the controller device.

16. The method as claimed in claim 14, wherein the signal quality measurements are signal strength measurements.

17. The method as claimed in claim 14, further comprising, in response to the request from the controller device, configuring the candidate device to act as a relay UE between the first and second UE.

18. A communications device comprising:
    a receiver, for receiving wireless signals;
    a transmitter, for transmitting wireless signals; and
    a processor adapted to:
    receive a request from a controller device to detect signals transmitted by a first user equipment, UE, and a second UE;
    determine a signal quality measurement of signals received from the first and second UEs;
    report the signal quality measurements of signals received from the first and second UEs to the controller device; and
    receive a request from the controller device to act as a relay node between the first and second UEs,
    wherein a base station serving the first UE and the second UE comprises the controller device.

19. The communications device as claimed in claim 18, wherein the processor is further adapted to:
    determine whether the candidate device can detect signals from both the first and second UEs; and
    as a result of determining that the candidate device can detect signals from both the first and second UEs, determine the signal quality measurements of signals received from the first and second UE and report the signal quality measurements to the controller device.

20. The communications device as claimed in claim 18, wherein the signal quality measurements are signal strength measurements.

21. The communications device as claimed in claim 18, wherein the processor is further configured, in response to the request from the controller device, to configure the candidate device to act as a relay UE between the first and second UE.

22. The communications device as claimed in claim 18, further comprising a memory containing instructions executable by said processor.

23. The method as claimed in claim 5, wherein the step of selecting the first candidate device to act as a relay between the first and second UEs further comprises:
    determining whether signal quality measurements received from a second candidate device indicate higher signal quality than the signal quality measurements received from the first and second UEs;
    as a result of determining that the signal quality measurements received from the second candidate device indicate higher signal quality than the signal quality measurements received from the first and second UEs, comparing the signal quality measurements received from the first candidate device and the signal quality measurements received from the second candidate device; and
    selecting the first candidate device to act as a relay between the first and second UEs as a result of determining that the signal quality measurements received from the first candidate device indicate higher signal quality than the signal quality measurements received from the second candidate device.

* * * * *